Figure 1:
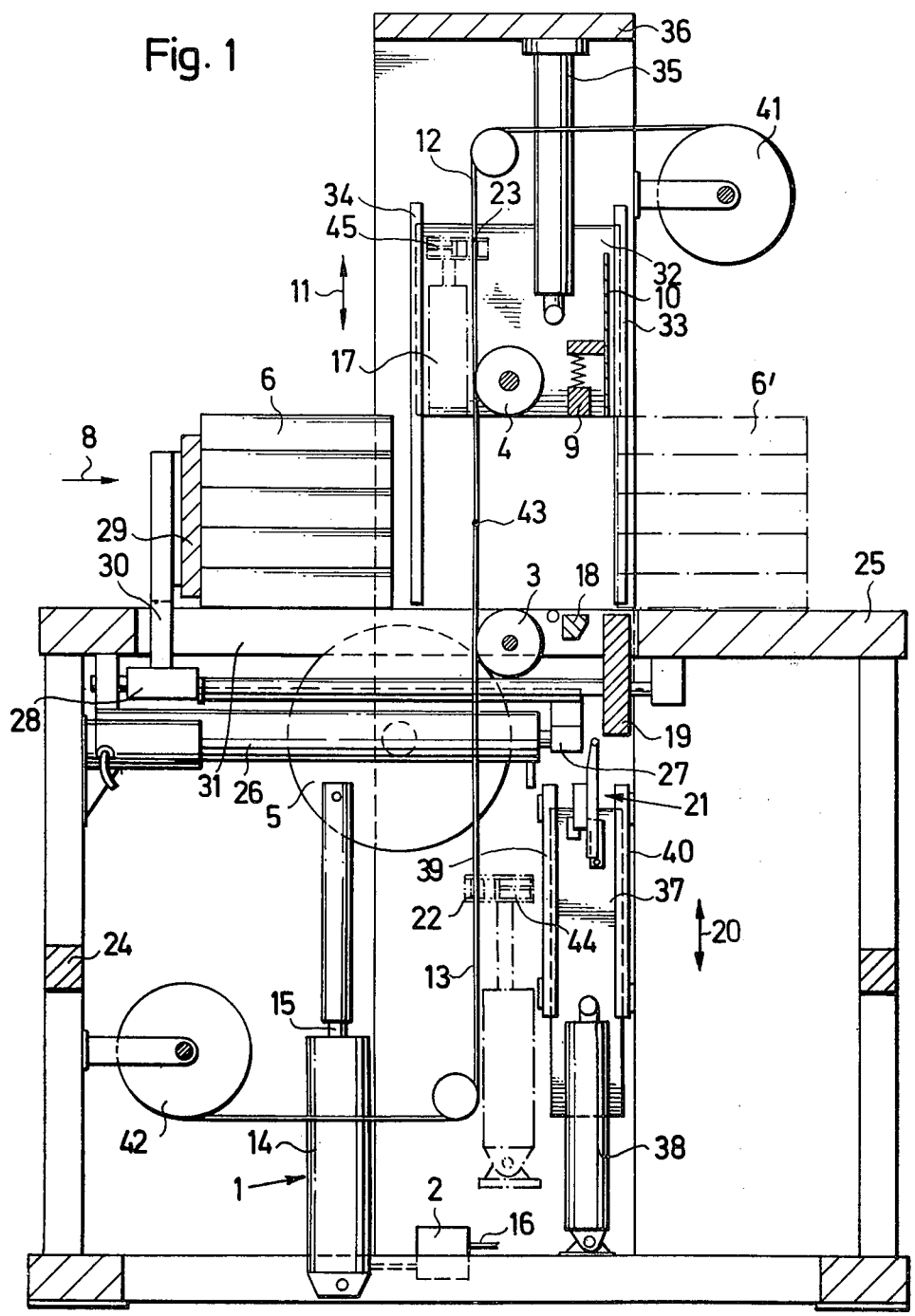

United States Patent [19]
Kiener et al.

[11] 3,956,873
[45] May 18, 1976

[54] BANDEROLLING APPARATUS
[76] Inventors: Josef Kiener; Eugen Lutz, both of Muhlbachstrasse 12, 8942 Ottobeuren, Germany
[22] Filed: June 17, 1974
[21] Appl. No.: 480,223

[30] Foreign Application Priority Data
June 20, 1973 Germany............................ 2331400

[52] U.S. Cl................................... 53/198 R; 53/373
[51] Int. Cl.².................... B65B 13/04; B65B 51/32
[58] Field of Search.................. 53/198 R, 379, 388, 53/373

[56] References Cited
UNITED STATES PATENTS

| | | |
|---|---|---|
| 2,741,885 | 4/1956 | Allison .............................. 53/198 R |
| 3,097,462 | 7/1963 | Langdon ....................... 53/198 R X |
| 3,162,564 | 12/1964 | Buchner............................. 53/388 X |
| 3,490,194 | 1/1970 | Monaghan .......................... 53/30 X |
| 3,564,810 | 2/1971 | Faletti................................ 53/198 R |
| 3,672,116 | 6/1972 | Ingmarson......................... 53/198 R |

Primary Examiner—Travis S. McGehee
Assistant Examiner—John Sipos
Attorney, Agent, or Firm—Holman & Stern

[57] ABSTRACT

In a banderolling apparatus in which banding material is wrapped around a stack of objects and tied by welding, the speed of operation and the effectiveness of the weld are promoted by applying cooling air at the welding zone through a clamping jaw adjacent the weld.

3 Claims, 4 Drawing Figures

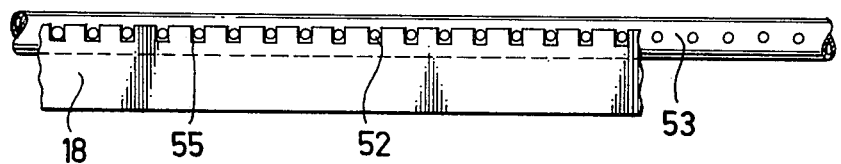
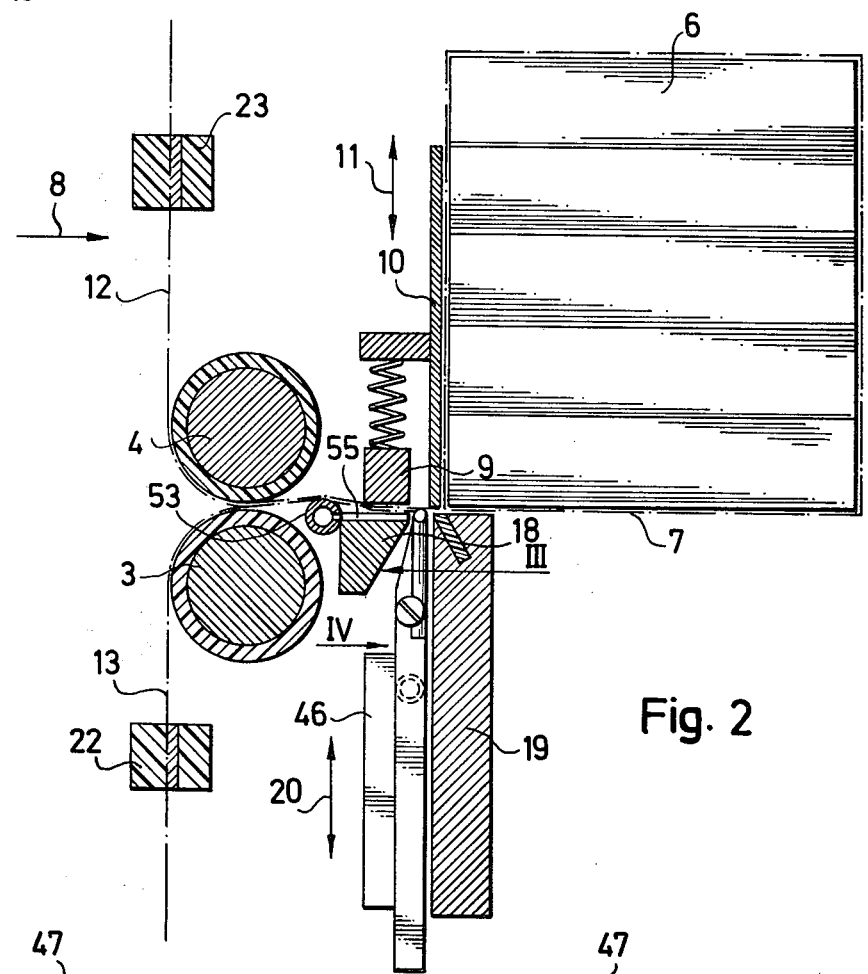
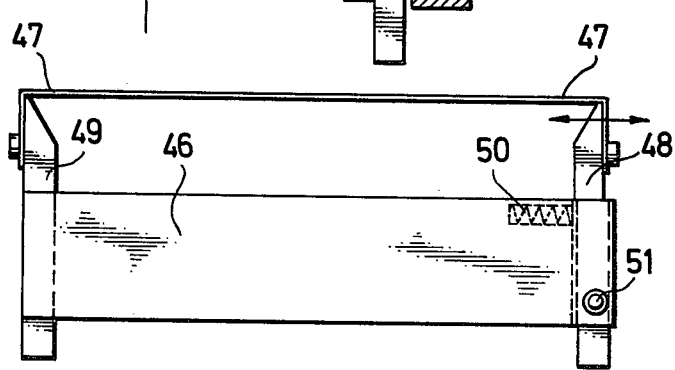

BANDEROLLING APPARATUS

This invention relates to an apparatus for the banderolling of a plurality of objects assembled in a group, this apparatus being of the kind comprising means for supporting said objects as a unit, means for supplying banding materials to said unit and wrapping it in a loop around the latter, clamps for holding the banding material at the neck of said loop, and a device for welding opposed areas of the banding material at the said neck.

The function of this known type of apparatus is to bind up a plurality of objects in a unitary assembly, particularly for sales purposes. As a rule two supply reels are used for the banding apparatus, the bands from these two reels being welded together, in effect, at opposite sides of the unit. Before the loop is finally welded it is drawn taut.

In order to perform the welding operation it is necessary to hold the two bands by a clamping action, viz. at the opposed parts of these two bands adjacent the group of articles and at a part spaced from this at the infeed side of the bands. For this purpose use is usually made of two pairs of clamping jaws. Since the weld is made between these two pairs, the distance between them must be very small if a proper seam is to be made and the tightness of the loop is not to give to any significant extent after the clamping jaws are released.

The rapidity of operation of apparatus of the prior art depends greatly on the hold which is required to perform a satisfactory and reliable weld. The welding operation, which is accompanied by a severing of the banding material must be allied with cooling to reduce the time taken for the weld to cool. If the clamping effect is prematurely released, that is to say before the weld is sufficiently cooled, there is a danger that the objects which have been enclosed in the loop will exert a sufficiently powerful pull on the weld to damage the latter. Having regard to the very small distance which, as mentioned above, must be allowed between the weld and the clamping means it is difficult to obtain effective cooling.

It is an object of the present invention to provide an apparatus of the kind set forth above, in which a simple, but very efficacious cooling can be achieved, suchwise as to notably increase the output of a machine. To this end, in accordance with this invention use is made in an apparatus of the kind set forth of an arrangement whereby at least one of the clamps or clamping jaws is apertured and is connected to a source of cooling air.

By this means a cooling air stream can be introduced directly at the welding zone without the need to make any increase or variation in the spacing between the individual clamping jaws and between them and the welding device, such as would otherwise introduce further disadvantages. The incoming cooling air can escape through the minimal gap between the clamping devices and the welding device thereby avoiding back pressures or other obstructing effects and a rapid cooling is achieved, even where large quantities of cooling air are directed to the welding zone.

In an advantageous arrangement use is made of four clamps arranged as two pairs of clamping jaws, one of each pair being movable and the other immobile, and the welding device is arranged and movable between the immobile jaws of the two pairs, one of which is apertured and connected to the source of cooling air. This arrangement has the advantage that clamping in the vicinity of the welding device can be held at a lower temperature as a result of which the cooling effect improves the cooling of the welds themselves. Further if a stationary clamp is provided with the apertures for the cooling air this facilitates the introduction of the latter. If required the cooling air admission means could be associated with one of the movable clamping jaws, but this is a less satisfactory arrangement.

In accordance with a further feature of the invention the apertures take the form of parallel channels at the working surface of one of said clamps. It has been found that this allows for unobstructive clamping by the clamps even where the air is provided right at the clamping surface. This means direct conduction of cooling air to the welding zone or zones, and has the secondary advantage that the cooling air channels can readily be supervised.

By a further feature of the invention the apertured clamp is provided with a set of spaced apertures and is connected to the cooling air source through a conduit provided with a set of holes registering with the spaced apertures in the clamp. This caters for effective distribution of the cooling air over the whole weld.

The welding device used in prior apparatus of this character is a bar which is brought against weldable banding material at the prescribed moment to form the weld. The sheet or strip materials being handled are frequently coated with a slip-promoting means or other substances which provide for ready feeding, and so on, but which can be a great nuisance when used in connection with welding. These additives may be deposited on the weld, leading to encrustation which inhibits a proper weld. Other residues may collect on the welding bar. These detrimental effects are usually first noticed when the loops of banding material are impaired. Removal of the impurities and deposits are difficult and time-consuming.

The present invention further proposes a welding device in apparatus of the kind set forth which essentially consists of a carrier element with a taut hot wire supported thereon and disposed at a spacing from the carrier element. Any displacements of the hot wire are quite minimal because of the small superficial area of the wire. Deposits on the carrier element are also small and not enough to interfere with the progress of the operation. Moreover any deposit on the hot wire can quickly be removed by a temporary increase in the operating temperature of this wire, thus ensuring a continuous, unimpeded operation.

In conjunction with the proposals concerning the introducing of cooling air, the use of the welding device according to the present invention affords a further advantage that only the hot wire is located in the direct vicinity of the welding point, and this is of very small dimensions certainly it does not interfere too much with the action of the cooling air at the critical time. Thus conditions are more favourable than when a welding appparatus of the presently commercially available kind is used.

In implementing the present arrangement the carrier element has two support arms carrying the wire, one of which is pivotable on the element and is subject to the action of a tension spring. This caters for an accurately predetermined positioning of the wire so that during the welding operation reels at least as good as those obtained with a welding bar will prevail. Variations in length due to heating up of the wire are entirely eliminated by use of the tension spring.

An embodiment of the invention is diagrammatically illustrated in the accompanying drawings, in which:

FIG. 1 is a side view, partly in section of a banderolling apparatus equipped with means according to the invention, FIG. 2 is a sectional illustration of a part of these means, shown on a larger scale, FIG. 3 is a view, taken in the direction of arrow III of FIG. 2, of part of the aforesaid means, and FIG. 4 is a view taken in the direction of arrow IV of FIG. 2 on a different scale.

The banderolling apparatus illustrated in FIG. 1 comprises a machine frame 24 with a table 25. Mounted in frame 24 is a piston-cylinder unit 26, the piston rod 27 of which operates a shifter 28 acting on a pusher plate 29 through the agency of a bar 30 projecting through a slot 31 in table 25. The pusher plate 29 is used to move the stack of objects 6 to be banderolled on table 25 to the position shown in chain dotted lines at 6' in FIG. 1.

A slide 32 arranged above the table and laterally of the path of travel of the objects 6 is movable on rails 33 and 34 in the directions indicated by the double arrow 11. This slide 32 is operated by a piston-cylinder unit 35 which is engaged with slide 32 and bears against part 36 of frame 24. Slide 32 carries a roller 4 and clamps 9 and 10. Clamp 9 is resiliently mounted.

A further slide 37 is movable beneath the table 25 on the machine frame and is moved by a piston-cylinder unit 38 on rails designated 39 and 40.

A welding device 21 is secured to slide 37 by clamping means.

Two supply reels 41 and 42 for banding material are mounted on the machine frame 24. The banding parts from these reels are respectively designated 12 and 13 and these are connected at 43 by welding. The weld 43 is produced during a banderolling operation as will be more specifically described hereafter.

A tightening roller 3, similar to roller 4, is mounted on the machine frame and can be driven by a wheel 5. The wheel 5 is operated by the piston-cylinder unit 1, the piston rod 15 of which turns driving wheel 5 and thus the tightening roller 3. Compressed air is supplied to piston-cylinder unit 1 through a compressed air conduit 16 which incorporates an excess pressure valve 2.

If so desired, in addition to the piston-cylinder unit 1 with its cylinder 14 and piston rod 15, and to the operating wheel 5, a further piston-cylinder unit 1', shown in chain dotted lines, can be mounted on the machine frame 24, the piston rod of this further unit carrying a clamping device 22 which is operated by a small piston-cylinder unit 44 which is movable with the piston rod of the assembly 1'.

If so desired an assembly 17 similar to the piston-cylinder unit 1' can be mounted on slide 32 and this, like piston-cylinder unit 1', is shown with its associated equipment in chain dotted lines. The piston rod of this unit 17 carries a small piston-cylinder unit 45 which operates a clamping device 23. Whilst the unit 1', which is optional, acts on the band part 13, the unit 17 and its clamping device 23 act on the band part 12.

With the objects 6 stacked as illustrated in FIG. 1 and ready for banderolling, unit 26 is operated to bring about a forward shift in the direction of arrow 8. The stack shown in chain dotted lines in FIG. 1 and moved to the position 6' takes with it the two parts 12 and 13 of the banding material now connected at the weld 43.

The width of the banding material needs to be suited to the width of the stack of objects 6 but can be substantially narrower than that of the objects. It will be apparent that during the shifting of the objects by means of the plate 29 the parts of the band can be wound off or drawn off both from reel 41 and from reel 42. Immediately following the termination of this advancing motion the pusher plate 29 returns to its starting position leaving the objects in their new position 6'.

The piston-cylinder unit 35 is now operated to move the slide 32 downwards in the direction of arrow 11. The roller 4 and the clamp 10, which extends substantially over the complete width of the banding material, pulls this material down into the lower position illustrated in FIG. 2. This forms the loop 7 around the objects 6 and closes the neck of this loop.

The banding material is usually tightened at this stage, preferably by means of the piston-cylinder unit 1 which is supplied through conduit 6 and valve 2 and acts through the piston rod 15 and the driving wheel 5 on roller 3. Alternatively tightening of the loop 7 can be performed by activating piston-cylinder units 1' and 17, the small piston-cylinder units 45 and 44, and the clamping devices 22 and 23 to act on the band parts 12 or 13, or on both parts.

The welding is now performed.

At the moment of welding the banding material parts 12 and 13 are held by the four clamps 9 and 10 and 18 and 19 forming two spaced pairs of clamping jaws. The clamps 9 and 10 are movable in the direction of the double arrow 11 and the clamp 10 serves as an abutment for the loop 7 and for objects 6. The welding device 21 acts between the two pairs of clamping jaws 10 and 19 on the one hand and 9 and 18 on the other. This welding device is movable in the direction of arrow 20 and the details thereof are shown more particularly in FIG. 4 which gives an individual picture of it.

It comprises a carrier element 46 which is clamped to slide 37 and has two support arms 48 and 49 between and over which a heating wire 47 is tightened. Whilst the arm 49 is rigidly secured to element 46, arm 48 is pivotable about the joint 51 and is subject to the action of a tension spring 50, this keeping the hot wire straight and tensioned at all times.

Whilst clamps 9, 10 and 19 are substantially uninterrupted over the full area of their clamping faces, clamp 18 has a set of apertures along its working face in the form of parallel channels 55. The conduit 53 for cooling air runs parallel to the working face of clamp 18 and is provided with a set of holes 52 registering with channels 55 so as to secure good distribution of the air at the welding zone.

When the means described are in use the stream of cold air first reaches the weld where the band parts 12 and 13 are connected and then, directly following this, the opposite weld at which the loop 7 is completed. The gap between the two pairs of clamps 18, 9 and 10, 19 is wholly available for exhausting the stream of cooling air. The hot wire 47 and the means associated therewith have been moved down and do not obstruct this flow of cooling air.

The welding operation completes the loop 7, forms the weld 43 and also separates the finished loop 7 from the banding parts 12 and 13.

We claim:

1. Apparatus for the banderolling of a plurality of objects, comprising means for supporting said objects as a unit, means for supplying banding material to said unit, means for supplying banding material to said unit and wrapping it in a loop around the latter, clamp means for holding the banding material at the neck of said loop, and a device for forming a weld seam between opposed areas of the banding material at the said neck, characterised by the improvement wherein said clamp means comprises four clamps arranged as two spaced apart pairs of clamping jaws, one of each pair being movable and the other immobile, said pairs of jaws defining a narrow space therebetween, said welding device arranged and movable in said space between said immobile jaws of the two pairs into and out of welding contact with said banding material, at least one of said immobile jaws including a plurality of parallel air channels therein communicating with a source of cooling air to provide cooling air from said source through said channels to the weld seam, said cooling air escaping from said weld seam area through said space, said channels disposed along a path substantially parallel a clamping surface which path substantially coincides with the intersection between the clamping surface of said one of said immobile jaws and said air escape space.

2. Apparatus according to claim 1, wherein the channeled one of said jaws is provided with a set of spaced channels and is connected to the cooling air source through a conduit provided with a set of holes registering with the spaced channels in said jaw whereby cooling air flows against the weld seam.

3. Apparatus according to claim 1, in which the welding device comprises a carrier element having two support arms carrying a hot wire freely guided and supported thereon, one arm of which is pivotable on the element and is subject to the action of a tension spring.

* * * * *